United States Patent [19]
Hillegas

[11] Patent Number: 5,937,401
[45] Date of Patent: Aug. 10, 1999

[54] DATABASE SYSTEM WITH IMPROVED METHODS FOR FILTERING DUPLICATES FROM A TUPLE STREAM

[75] Inventor: Richard Hillegas, San Francisco, Calif.

[73] Assignee: Sybase, Inc., Emeryville, Calif.

[21] Appl. No.: 08/757,367

[22] Filed: Nov. 27, 1996

[51] Int. Cl.⁶ .................................................. G06F 17/30
[52] U.S. Cl. ............................ 707/2; 707/3; 707/201; 707/10
[58] Field of Search .................................. 707/2, 3, 201, 707/10; 364/282.1, 283.4, 283.1, 222.81

[56] References Cited

U.S. PATENT DOCUMENTS

| | | | |
|---|---|---|---|
| 4,527,253 | 7/1985 | Sato et al. ................................ | 364/900 |
| 4,606,002 | 8/1986 | Waisman et al. ....................... | 364/200 |
| 4,677,550 | 6/1987 | Ferguson ................................. | 364/300 |
| 4,791,561 | 12/1988 | Huber ...................................... | 364/300 |
| 4,805,099 | 2/1989 | Huber ...................................... | 364/300 |
| 4,947,319 | 8/1990 | Bozman .................................. | 364/200 |
| 4,947,320 | 8/1990 | Crus et al. .............................. | 364/200 |
| 4,956,774 | 9/1990 | Shibamiya .................................. | 707/2 |
| 5,062,055 | 10/1991 | Chinnawamy et al. ................. | 364/513 |
| 5,089,952 | 2/1992 | Bozman .................................. | 395/725 |
| 5,123,104 | 6/1992 | Levine et al. ........................... | 395/600 |
| 5,163,148 | 11/1992 | Walls ...................................... | 395/600 |
| 5,204,958 | 4/1993 | Cheng et al. ........................... | 395/600 |
| 5,210,870 | 5/1993 | Baum et al. ............................ | 395/600 |
| 5,237,681 | 8/1993 | Kagan et al. ........................... | 395/600 |
| 5,265,244 | 11/1993 | Ghosh et al. ........................... | 395/600 |
| 5,367,675 | 11/1994 | Cheng et al. ............................... | 707/2 |
| 5,394,531 | 2/1995 | Smith ..................................... | 395/425 |
| 5,412,804 | 5/1995 | Krishma .................................... | 707/2 |
| 5,430,869 | 7/1995 | Ishak et al. ............................ | 395/600 |
| 5,450,561 | 9/1995 | Ryan ....................................... | 395/403 |
| 5,455,945 | 10/1995 | Richard ..................................... | 707/2 |
| 5,465,352 | 11/1995 | Nakazawa et al. ..................... | 395/600 |
| 5,469,568 | 11/1995 | Scheifer et al. ............................ | 707/2 |
| 5,495,591 | 2/1996 | Ryan ................................... | 395/421.03 |
| 5,526,511 | 6/1996 | Swenson et al. ....................... | 395/461 |
| 5,537,635 | 7/1996 | Douglas .................................. | 395/456 |
| 5,542,073 | 7/1996 | Schiefer et al. ............................ | 707/2 |
| 5,542,089 | 7/1996 | Lindsay et al. ............................ | 707/2 |
| 5,594,898 | 1/1997 | Dalal et al. ................................ | 707/2 |
| 5,608,904 | 3/1997 | Chaudhuri et al. ........................ | 707/2 |
| 5,644,763 | 7/1997 | Roy ........................................ | 395/612 |
| 5,666,525 | 9/1997 | Ross .......................................... | 707/2 |
| 5,666,528 | 9/1997 | Thai ....................................... | 707/102 |
| 5,668,987 | 9/1997 | Schneider .............................. | 395/603 |
| 5,701,454 | 12/1997 | Bhargava et al. .......................... | 707/2 |
| 5,727,196 | 3/1998 | Strauss et al. ............................ | 707/2 |

OTHER PUBLICATIONS

Comer, D., "The Ubiquitous B–Tree," Computing Surveys, Jun. 1979, pp. 121–137.

Stevens, A., "Hypertree: A Hypertext Index Technique," Dr. Dobb's Journal, Jun. 1990, pp. 135–136, 138–140, 154, 156–159.

Baker, M., "B–tree indexing, A look at indexing tradeoffs in dBASE, Clipper, and FoxPro," Programmer's Journal, Nov./Dec. 1990, pp. 42–46.

Ferguson, D., "Bit–Tree," Communications of the ACM, Jun. 1992, pp. 115–120.

Williams, W., "Supercharging Sequential Searches, Speed plus compression equals faster searches," Dobb's Journal, Dec. 1990, pp. 54, 56, 58–61.

*Primary Examiner*—Paul V. Kulik
*Assistant Examiner*—Jean M. Corrielus
*Attorney, Agent, or Firm*—John A. Smart

[57] ABSTRACT

A Client/Server Database system is described which includes a Database Server providing methods eliminating duplicates from an ordered tuple stream (e.g., resulting from a query involving a database "join"), without the need for performing an expensive sort operation. Specifically, the system provides a "filter" which eliminates duplicates without having to perform a sort. The filter, which is implemented as an optimization at the level of the query processor, comprises two basic pieces. The first piece, INIT_FILTER, simply serves to initialize the filter—that is, the piece sets a flag that forces the filter to pass the first tuple encountered and to construct a first key from it. The second piece, FILTER, serves as the actual filter, when the system scans the tuple stream. If the current tuple has the same key as the preceding tuple, then the current tuple is thrown away. Otherwise, the current tuple is passed and a new key is constructed from it. The positions of both INIT_FILTER and FILTER in a given join order are important. INIT_FILTER immediately preceeds the scan which initializes the filter; FILTER immediately follows the scan which actually performs the filtering.

10 Claims, 3 Drawing Sheets

Microfiche Appendix Included
(1 Microfiche, 35 Pages)

US 5,937,401

DATABASE SYSTEM WITH IMPROVED METHODS FOR FILTERING DUPLICATES FROM A TUPLE STREAM

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

MICROFICHE APPENDIX

A single-fiche Microfiche Appendix, containing 35 frames, is included with this application.

BACKGROUND OF THE INVENTION

The present invention relates generally to information processing environments and, more particularly, to employing methods for eliminating duplicate rows or tuples in a tuple stream occurring in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif.

Today, there exists great interest in optimizing system performance in database servers, for instance, by increasing the speed at which query processing occurs. In routine database use, one is often faced with sets of duplicate records, either in one's underlying tables or in result tables (i.e., tables generated on-the-fly by joining tables together). Although relational database systems have been designed with the premise that tables would comprise unique records or rows, one generally finds that users of such systems have tables (either system-created and/or user-created) which contain duplicate rows. Nevertheless, often a user will desire to impose a mask on the data so that the system returns only one row or record for each duplicate. Moreover, users want this task performed efficiently and expeditiously.

Present-day techniques for eliminating duplicates from a tuple stream or table resort to sorting operations. Even if duplicates are received in order (e.g., from a clustered-indexed table having a non-unique index), a sort approach entails creation of a result table in which to store the results of the sort (for eliminating duplicates). Since the approach leads to substantial I/O (input/output) overhead, it is not performance-optimized.

Another approach to eliminating duplicates in a tuple stream is to store a history list or structure. For instance, one could create a hashtable for storing key values already encountered in a tuple stream. To determine whether a new tuple were unique, the system need only index into ("hash") the appropriate hashtable entry, for determining whether the key value had already been encountered. Although that approach will work, it is far too slow to be practical. Quite simply, the overhead of such a lookup mechanism (which requires extensive I/O activity) would impede system performance to the point where it would be unacceptable to users.

What is desired is an approach which allows the system to "throw away" duplicates as they occur in a tuple stream. At the same time, however, such an approach should not incur costly lookup or other list-processing operations. The present invention fulfills this and other needs.

SUMMARY OF THE INVENTION

A Client/Server Database system is described which includes a Database Server providing methods for eliminating duplicates from an ordered tuple stream (e.g., resulting from a query involving a database "join"), without the need for performing an expensive sort operation. In an exemplary embodiment, the system includes one or more Clients (e.g., Terminals or PCs) connected via a Network to a Server. The Server, operating under a server operating system (e.g., UNIX) includes a Database Server System, such as Sybase SQL Server™. In general operation, Clients store data in and retrieve data from one or more database tables resident on the Server by submitting SQL commands. Typical SQL commands specify "queries"—criteria for selecting records of a table for a particular operation (e.g., updating).

During system operation, the SQL statements received from the one or more Clients are processed by an Engine of the Database Server. The Engine itself comprises a Parser, a Normalizer, a Compiler, an Execution Unit, and Access Methods. Specifically, the SQL statements are passed to the Parser which converts the statements into a query tree—a binary tree data structure which represents the components of the query in a format selected for the convenience of the system.

The Code Generator ultimately converts the query tree into a set of instructions suitable for satisfying the query. These instructions are passed to the Execution Unit. Operating under the control of these instructions, the Execution Unit generates calls into lower-level routines, such as the Access Methods, for carrying out the query-specified operation, such as fetching relevant information (e.g., a row) from a database table. After the plan has been executed by the Execution Unit, the Server returns a query result or answer table back to the Client(s).

Often times during operation of a database system, an ordered tuple stream is created, one in which duplicates appear one after the other. According to the present invention, duplicates are eliminated from an ordered tuple stream (e.g., resulting from a query involving a database "join") without the need for performing an expensive sort operation. When uniqueness is desired, the first time a given key is encountered subsequent copies of the key which follow can be ignored. The approach of the present invention is to throw away duplicates as they percolate through the join order.

Given a sorted order, the present invention provides a "filter" which allows the system to eliminate duplicates without having to perform a sort—an expensive operation. The order itself is one imposed by an index (as opposed to one created on-the-fly). The filter, which is implemented as an optimization at the level of the query processor, comprises two basic pieces. The first piece, INIT_FILTER, simply serves to initialize the filter—that is, the piece sets a flag that forces the filter to pass the first tuple encountered and to construct a first key from it. The second piece, FILTER, serves as the actual filter, when the system scans the tuple stream. If the current tuple has the same key as the preceding tuple, then the current tuple is thrown away. Otherwise, the current tuple is passed and a new key is constructed from it. The positions of both INIT_FILTER and FILTER in a given join order are important. INIT_FILTER immediately preceeds the scan which initializes the filter; FILTER immediately follows the scan which actually performs the filtering.

An exemplary tuple filtering method of the present invention comprises the following steps. For flattened IN subqueries, the method performs the following initial four steps. During Preprocessing, the method locates any FlattenedTables that meet the filtering criteria; these are marked as CandidateTables. During IndexScoring, the method locates any "filtering" indexes; if the join index selected for a CandidateTable satisfies the filtering criteria, then it is marked as a FilteringIndex. The method calculates FilteredRowCount and FilteredPageCount. During JoinCosting, the method considers join orders in which the CandidateTable is outer to the table it joins with. In these cases, the method only considers using the FilteringIndex, and computes the cost using FilteredRowCount and FilteredPageCount. When the method has picked the final join order, if it has chosen a FilteringIndex, then the method attaches a filter to the join order. The CandidateTable is marked as both the InitializerScan and the FilterScan.

For DISTINCT queries, the method performs the following initial step. If the final join order has GoodOrder, then the method attaches a filter. The outermost table is marked as the InitializerScan and the innermost table is marked as the FilterScan.

The remaining steps apply to both the IN-subquery and the DISTINCT cases. The CodeGenerator builds the appropriate machinery onto the InitializerScan and the FilterScan. At runtime, the InitializerScan resets the filter so that it will pass the first tuple. (exec_eop()). At runtime, for each tuple, the FilterScan constructs a key. If the filter has just been re-initialized or if the key has changed, the FilterScan passes the tuple. Otherwise, the FilterScan throws away the tuple.

DETAILED DESCRIPTION OF A PREFERRED EMBODIMENT

The following description will focus on the presently-preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
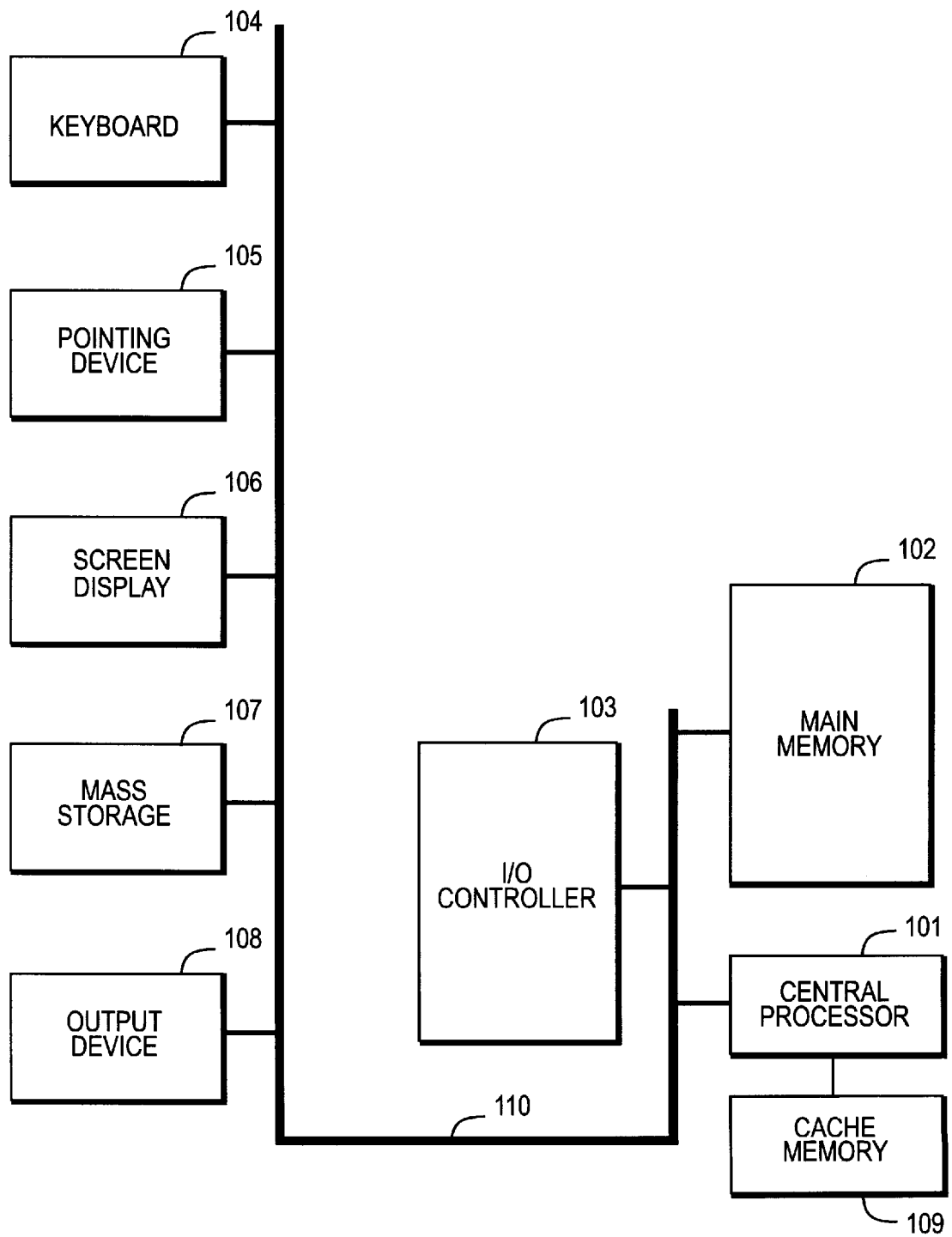
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a persistent or mass storage 107 (e.g., hard or fixed disk, removable or floppy disk, optical disk, magneto-optical disk, and/or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
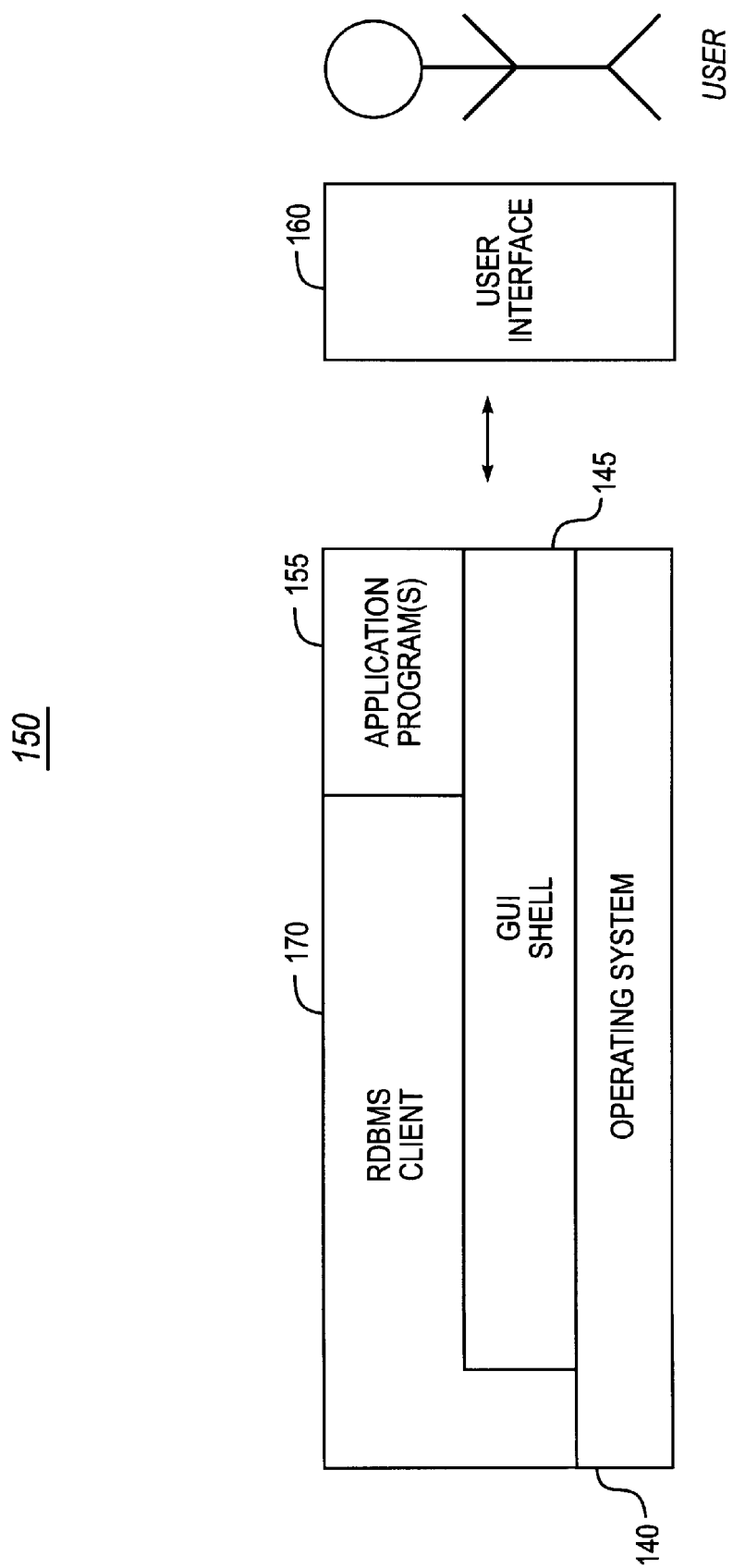
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a GUI (graphical user interface) shell 145. One or more application programs, such as application software 155, may be "loaded" (i.e., transferred from storage 107 into memory 102) for execution by the system 100. The system also includes a UI (user interface) 160 for receiving user commands as input and displaying user data as output. Although shown as a separate component, the UI 160 is typically provided by the GUI operating under the control of the OS 140, program(s) 155, and Relational Database Management System (RDBMS) client 170. The RDBMS client or "front-end" 170 itself may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/Server Database Management System

Figure 2:
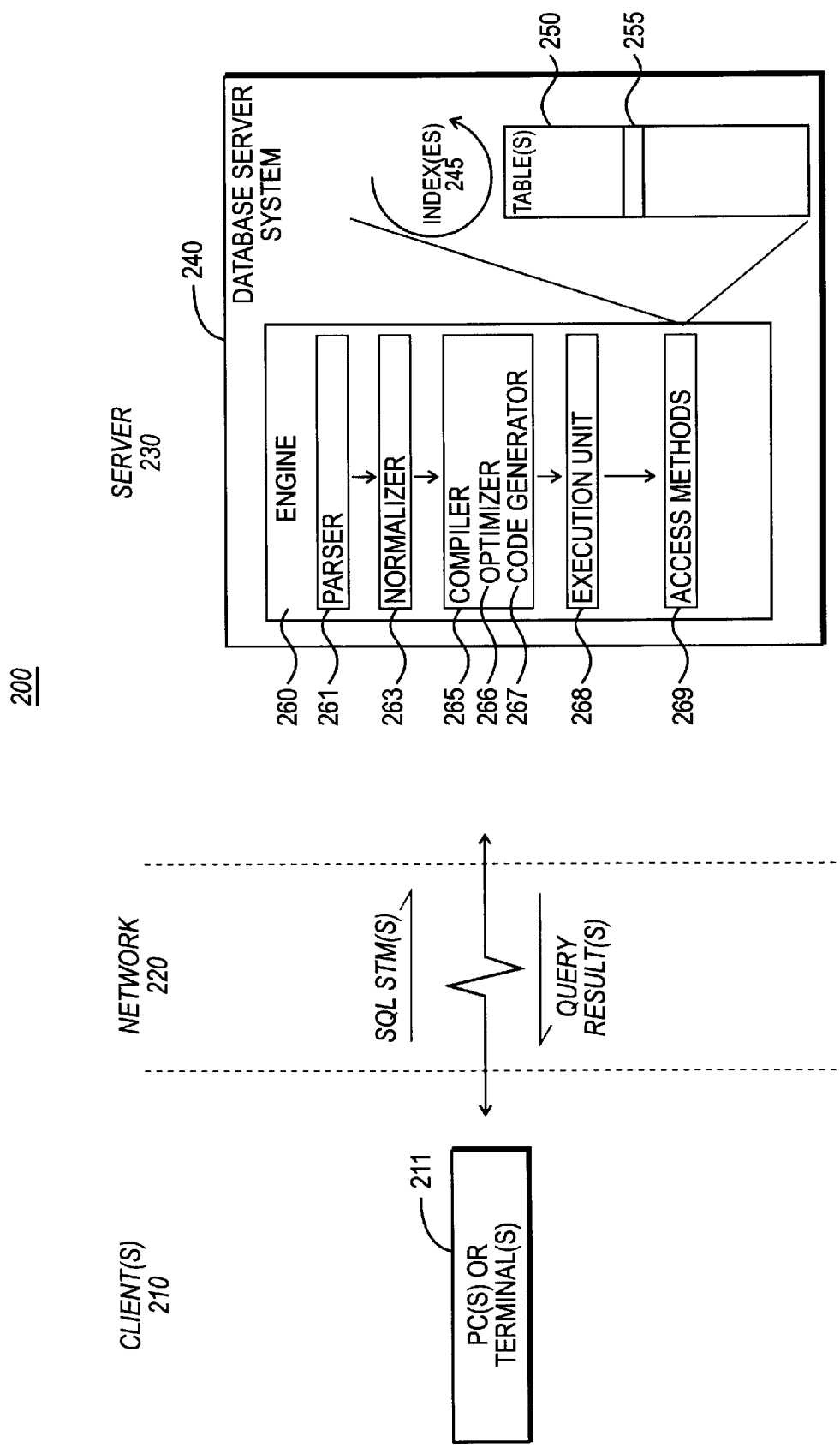
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2 illustrates the general structure of a Client/Server Database System 200 which is preferred for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (Sybase, Inc. of Emeryville, Calif.) in an exemplary embodiment, generally operates as an independent process (i.e., independently of the clients) running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client SQL calls and its parameters into a format (of one or more packets) suitable for transmission across a cable or wire, for delivery to the Database Server 240.

Client/server environments, database servers, and networks are well documented in the technical, trade, and patent literature. For a general discussion of database servers and client/server environments, see, e.g., Nath, A., *The Guide to SQL Server,* Second Edition, Addison-Wesley Publishing Company, 1995. For a discussion of a computer network employing Microsoft Networks/OpenNet File Sharing Protocol, see Method and System for Opportunistic Locking in a Networked Computer System, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare,* Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

During a database session or "connection" with the Server, each Client issues one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems.* In addition to retrieving the data from Database Server tables, the Clients also include the ability to insert new rows of data records into the table; Clients can also modify and/or delete existing records in the table.

During system operation, the SQL statements received from the one or more Clients 210 (via Network 220) are processed by Engine 260 of the Database Server System 240. The Engine 260 itself comprises a Parser 261, Normalizer 263, Compiler 265, Execution Unit 268, and Access Methods 269. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization rewrites the query tree into a cononical form. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator 267, on the other hand, converts the query tree into a set of instructions suitable for satisfying the query. These instructions are passed to the Execution Unit 268. Operating under the control of these instructions, the Execution Unit 268 generates calls into lower-level routines, such as the Access Methods 269, for carrying out the query-specified operation, such as fetching relevant information (e.g., row 255) from the database table 250. After the plan has been executed by the Execution Unit, the Server returns a query result or answer table back to the Client(s).

For enhancing the speed in which the Database Server stores, retrieves, and presents particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

Optimized Tuple Filtering Methodology in a Relational Database System

A. Overview

Often times during operation of a database system, an ordered tuple stream is created, one in which duplicates appear one after the other. According to the present invention, duplicates are eliminated from an ordered tuple stream (e.g., resulting from a query involving a database "join") without the need for performing an expensive sort operation. When uniqueness is desired, the first time a given key is encountered subsequent copies of the key which follow can be ignored. The approach of the present invention is to throw away duplicates as they percolate through the join order.

B. General Construction of a "Filter"

Given a sorted order, the present invention provides a "filter" which allows the system to eliminate duplicates without having to perform a sort—an expensive operation. The order itself is one imposed by an index (as opposed to one created on-the-fly). The filter, which is implemented as an optimization at the level of the query processor, comprises two basic pieces. The first piece, INIT_FILTER, simply serves to initialize the filter—that is, the piece sets a flag that forces the filter to pass the first tuple encountered and to construct a first key from it. The second piece, FILTER, serves as the actual filter, when the system scans the tuple stream. If the current tuple has the same key as the preceding tuple, then the current tuple is thrown away. Otherwise, the current tuple is passed and a new key is constructed from it. The positions of both INIT_FILTER and FILTER in a given join order are important. INIT_FILTER immediately preceeds the scan which initializes the filter; FILTER immediately follows the scan which actually performs the filtering.

C. Exemplary Scenarios

Operation of the present invention is perhaps best illustrated by way of example. Consider two cases: (1) DISTINCT query, and (2) IN subquery. Exactly "where" each of the two pieces or parts of the filter is applied varies for each of these queries. In the case of the IN subquery, the initialization part and tuple filtering part are attached to the inner table. For the DISTINCT case, on the other hand, the initialization piece is attached to the outermost table and the tuple filtering piece is attached to the innermost table. In the instance of a single table, both pieces attach to that single table (which serves as both the inner and outer table). The decision where to apply the optimization is made at runtime.

1. DISTINCT Queries

DISTINCT queries entail a target list consisting of simple columns (no expressions) from a single table. Costly sorting is not required in this case. Instead, after the join operation or function is done, the system can simply eliminate the sort and attach a filter. Here, the system places the target list's table on the outermost join slot, and choses for that scan an index whose key has as a prefix some permutation of the target list columns.

Consider the following query:
SELECT DISTINCT a1, a2, a3
FROM A, B, C, D
WHERE . . .

Here, a1, a2, and a3 represent columns which comprise the key. Provided that A is the first table in the join order and that the system selected an index on A such that some permutation of (a1, a2, a3) is a prefix of the index key, the system can attach a filter to the join order as follows:

INIT_FILTER(a1, a2, a3)->A->C->B->D->FILTER(a1, a2, a3)

This syntax defines a filter in terms of the columns on which it is defined. The syntax indicates that the filter is initialized on those key columns, followed by the actual join order which is chosen, followed by the actual filter on the key columns. Here, the key columns define the actual filter to be applied. As previously indicated, the positions of both INIT_FILTER and FILTER in the join order are important. INIT_FILTER immediately preceeds the scan which initializes the filter; FILTER immediately follows the scan which actually performs the filtering. Before the system starts a scan on Table A, the system first initializes the filter. The filter is executed for each tuple which qualifies on Table D. The tuple stream will come back ordered on some permutation of (a1, a2, a3) because A heads the join order. The Filter at the end eliminates duplicates.

2. IN subqueries

Consider the following query which also includes a subquery.

SELECT* FROM A, B, C

WHERE ... AND a1 IN (

SELECT t1 FROM T

WHERE a2 = t2 AND a3 = t3

)

Here, a1, a2, and a3 are columns in table or relation A; t1, t2, and t3 are columns in table T. Conceptually, the subquery materializes a separate result set. This can be viewed as the subquery generating an inner result table which, then, is joined to an outer result table.

In general, three techniques are available for processing subqueries. One approach is to materialize the results of the subquery—that is, materialize the result set thereof. Another approach is that of nested acquisition. With such an approach, when joining an outer table, the system runs the subquery each time the subquery result is required (e.g., for each tuple of the outer table). In other words, every time the system needs to know whether the subquery condition is satisfied, the system must run the subquery. Here, for instance, for every tuple on the outer table, the system constructs a result set from the inner table. A third approach is "flattening." Here, the system takes the table or tables in the subquery and folds them into the outer query, with a particular dependency noted. The dependency required for flattening is that the table or tables from the inner group are scanned after the tables that they join to. If a flattened table joins with one other table and the join or joins are equi-join (i.e., column equals column), then it represents a candidate for the optimization.

Filters can be used to relax the join order for some flattened subqueries. Normally, T would be flattened into an "exists" (i.e., SQL EXISTS) scan inner to the table it correlates with (viz. A). However, if the system selects an index on T such that some permutation of (t1, t2, t3) is a leading prefix of the key, then the system can attach a filter and move T outer to A, supporting join orders like the following:

INIT_FILTER(t1, t2, t3)->T->FILTER(t1, t2, t3)->B->A->C

In this second example, a key exists which defines the filter—a key on columns t1, t2, and t3. If the inner table is flattened into the outer query, a join would result on columns t1, t2, and t3 (because these columns all join to Table A, as these define the key). Before the scan is started on Table T, the system initializes the filter, on key columns t1, t2, and t3. For every tuple which qualifies from T, the system applies the filter—performing the key comparisons, for throwing away duplicates.

In a flattened IN subquery, like the one above, the subquery must contain only one table. Furthermore, the flattening must force only equijoins between the subquery table and only one outer table. The equijoins must be on simple columns (with no expressions). In this case, the optimizer identifies flattened tables where filtering may be useful.

D. Summary of Scenarios for Tuple Filtering

Case #1: DISTINCT queries where the target list consists of simple columns (no expressions) from a single table. Here, the Optimizer must have (1) placed the target list's table on the outermost join slot and (2) chosen for that scan an index whose key has as a prefix some permutation of the target list columns.

```
Example 1:
    Schema:     Table A    ( a1, a2, a3 )
                index A1   ( a2, a3, a1 )
                Table B    ( b1, b2 )
    Candidate
    Queries:
                /* order of targetlist columns doesn't matter */
                select distinct a1, a2, a3
                from A, B
                where a1 = b1 and
                      a2 = b2
                select distinct a3, a2
                from A, B
                where a1 > b1
                select distinct A.*
                from A, B
                where a1 + a2 = b1 + b2
                select distinct A.*
                from A, B
                where a1*b1*b1 + a2*b1 + a3 = 0
    NON-Candidate
    Queries:
                /* targetlist not a prefix subset of index key */
                select distinct a1, a3
                from A, B
                where a1 = b1 and
                      a2 = b2
                select distinct a3
                from A, B
                where a1 > b1
                /* more than 1 table in targetlist */
                select distinct *
                from A, B
                where a1( b1*b1) + a2*b1 + a3 = 0
                /* not a DISTINCT query */
                select a3, a2
                from A, B
                where a1 > b1
                /* expression in targetlist */
                select distinct a3+4, a2
                from A, B
                where a1 > b1
Example 2:
    Schema:     Table A       ( a1, a2, a3, a4 )
                Index A1      ( a2, a4 )
                Table B       ( b1, b2, b3 )
                Table C       ( c1, c2, c3, c4 )
    Candidate
    Queries:    select distinct a4, a2
                from A, B, C
                where a1 = b1 and
                      b2 = c2 and
                      a3 > c3
                select distinct a2
                from A, B, C
                where a3 * a4 = b3 * b4 and
                      a4 = c4 and
                      b2 = c2
    NON-Candidate
    Queries:
                /* targetlist not prefix subset of index key */
                select distinct a4
                from A, B, C
                where a1 = b1 and
                      b2 = c2 and
                      a3 > c3
                /* more than 1 table in targetlist */
                select distinct a2, b2
                from A, B, C
                where a1 = b1 and
                      b2 = c2 and
                      a3 > c3
                /* not a DISTINCT query */
                select a2
                from A, B, C
                where a3 * a4 = b3 * b4 and
                      a4 = c4 and
                      b2 = c2
                /* expression in targetlist */
                select distinct a2*a2
                from A, B, C
                where a3 * a4 = b3 * b4 and
                      a4 = c4 and
                      b2 = c2
Example 3:
    Schema:     Table A       ( a1, a2, a3, a4, a5 )
                Index A1      ( a2, a3, a4 )
                Table B       ( b1, b2, b3 )
                Table C       ( c1, c2, c3 )
                Table D       ( d1, d2, d3 )
                Table E       ( e1, e2, e3, e4 )
    Candidate
    Queries:    select distinct a3, a2
                from A, B, C, D, E
                where a1 = b1 and
                      a2 = c2 and
                      a3 = d3 and
                      a4 = e4
    NON-Candidate
    Queries:
                /* targetlist not a prefix subset of index key */
                select distinct a3
                from A, B, C, D, E
                where a1 = b1 and
                      a2 = c2 and
                      a3 = d3 and
                      a4 = e4
                /* more than 1 table in targetlist */
                select distinct a3, b1
                from A, B, C, D, E
                where a1 = b1 and
                      a2 = c2 and
                      a3 = d3 and
                      a4 = e4
                /* not a DISTINCT query */
                select a2, a3
                from A, B, C, D, E
                where a1 = b1 and
                      a2 = c2 and
                      a3 = d3 and
                      a4 = e4
                /* expression in targetlist */
                select distinct a2+7, a3
                from A, B, C, D, E
                where a1 = b1 and
                      a2 = c2 and
                      a3 = d3 and
                      a4 = e4
```

Case #2: Flattened IN subquery. The subquery must contain only one table. Furthermore, the flattening must force only equijoins between the subquery table and only one outer table. The equijoins must be on simple columns (again, no expressions).

Example:
Schema:  Table T      ( t1, t2, t3, t4 )
         Index T1     ( t2, t3, t1 )
         Table U      ( u1, u2, u3 )
         Table A      ( a1, a2, a3, a4 )
         Table B      ( b1, b2, b3 )

Candidate Queries:
```
select *
from A, B, C
where a1 in
    (
        select t1 from T
        where a2 = t2 and
              a3 = t3
    )
```

NON-Candidate Queries:
```
/* more than 1 table in subquery */
select *
from A, B, C
where a1 in
    (
        select t1 from T, U
        where a2 = t2 and
              a3 = t3 and
              a3 = u3
    )
/* inner table joins with more than 1 outer table*/
select *
from A, B, C
where a1 in
    (
        select t1 from T
        where a2 = t2 and
              b3 = t3
    )
/* non-equijoins between inner and outer table */
select *
from A, B, C
where a1 in
    (
        select t1 from T
        where a2 > t2 and
              a3 = t3
    )
/* expression in join */
select *
from A, B, C
where a1 in
    (
        select t1 from T
        where a2 = t2+5 and
              a3 = t3
    )
```

Internal Operation

A. Terms

Description of internal operation is facilitated by defining the following terms.

| | |
|---|---|
| Preprocessing | This is the phase of Query Optimization in which various heuristics are applied to prune the search space. |
| IndexScoring | This is the phase of Query Optimization in which an optimal index is picked for each join clause of each table. |
| JoinCosting | This is the phase of Query Optimization in which a cost is calculated for each possible join order. |
| RunTime | This is the Query Execution phase, when tables are read and joined and a tuple stream is returned to the Client. |
| FlattenedTable | A single table subquery may be "flattened" into its parent query (i.e., so that it is no longer a nested query). Such a table is called a "FlattenedTable." |
| CandidateTable | If a FlattenedTable joins with only 1 table from the outer query block AND all those joins are equijoins, then the FlattenedTable is a candidate for tuple filtering. We call it a CandidateTable. |
| FilterIndex | If the join columns of a CandidateTable are a prefix subset of an index' key, then we say that the index is a FilterIndex. |
| FilteredRowCount | The estimated number of rows which will pass the filter. |
| FilteredPageCount | The estimated number of pages which will be read by a filtered scan. |
| GoodOrder | For a DISTINCT query, if the targetlist is a prefix subset of the index key for the outermost scan, we call the selected join order a GoodOrder. |
| InitializerScan | This is the outer scan which resets the Filter at RunTime, forcing the FilterScan to pass the next tuple. |
| FilterScan | This is the inner scan which constructs/compares Filter keys at RunTime. This scan determines whether the key has changed. If so, the tuple is passed. |

B. General Data Structures

In an exemplary embodiment, three core data structures are employed:

(1) a result descriptor or "resdom" list describing the filter columns;

(2) a qualification tree comparing the filter columns to the previously stored key; and (3) an "EVAL" list that constructs new keys and compares the current tuple to the previous key, where each "EVALs" represents an executable instruction to the database server's Virtual Machine.

The resdom list is constructed to describe the filter keys. For the DISTINCT query case, the resdom list is just the target list of the query. For the flattened subquery case, a resdom list is explicitly constructed at index scoring time, by a q_score_index() function. The Optimizer allocates CONSTANTs to save the columns of the previous key. Then the Optimizer builds a qualification tree comparing the filter columns to the stored CONSTANTs. The Code-generator walks this qualification to build key-constructing EVALs. Then the Code-generator uses the qualification, through constree() function, in order to build the key-comparing EVALs.

C. Preferred Methodology

A tuple filtering method of the present invention comprises the following steps.

(Steps 1-4 only apply to optimization of flattened IN subqueries.)

1) During Preprocessing, the method locates any FlattenedTables that meet the filtering criteria; these are marked as CandidateTables. (sqx_find_dupfilter())

2) During IndexScoring, the method locates any "filtering" indexes; if the join index selected for a CandidateTable satisfies the filtering criteria, then it is marked as a FilteringIndex. The method calculates FilteredRowCount and FilteredPageCount. (q_isprefix_filter(), j_preview_indices(), j_preview_cost()).

3) During JoinCosting, the method considers join orders in which the CandidateTable is outer to the table it joins with. In these cases, the method only considers using the FilteringIndex, and computes the cost using FilteredRowCount and FilteredPageCount. (j_initperm(), j_tables()).

4) When the method has picked the final join order, if it has chosen a FilteringIndex, then the method attaches a filter to the join order. The CandidateTable is marked as both the InitializerScan and the FilterScan. (j_attachFilters()).

(Step 5 only applies to DISTINCT queries)

5) If the final join order has GoodOrder, then the method attaches a filter. The outermost table is marked as the InitializerScan and the innermost table is marked as the FilterScan. (opt_considerFiter()).

(The remaining steps apply to both the IN-subquery and the DISTINCT cases)

6) The CodeGenerator then builds the appropriate machinery onto the InitializerScan and the FilterScan. (com_initializeFilter(), com_buildFilter(), com_constructKey(), com_compareKey()).

7) At runtime, the InitializerScan resets the filter so that it will pass the first tuple. (exec_eop()).

8) At runtime, for each tuple, the FilterScan constructs a key. If the filter has just been re-initialized or if the key has changed, the FilterScan passes the tuple. Otherwise, the FilterScan throws away the tuple. (exec_eop()).

D. Description of Individual Functions 1. sqx_find_dupfilter

The entry point into the optimization method is the function sqx_find_dupfilter, which in an exemplary embodiment may be constructed as follows.

```
/*
** SQX_FIND_DUPFILTER
**
** Check if the range entry in the subquery is a candidate for
** duplicate filtering optimization. This routine is called while
** flattening a subquery. A table is marked as a candidate for tuple
** filtering if the following rules are met:
**
**      o Its a single table subquery
**      o Its correlated to a single table in the outer query block.
**      o All correlation clauses are of the form:
**
**           VAR = <correlated expression>
**
**      o Other clauses that are allowed are:
**           VAR RELOP <non-correlated constant expression>
**
**      o There are no theta join clauses on this range entry.
**           (non-equijoin clauses with constant expressions are allowed).
**
** Mark the range entry as RGNDR_DUPFILTER
**
** Parameters:
**      subq - Ptr. to subquery node.
**
** Returns:
**      Nothing.
**
*/
SYB_STATIC void
sqx_find_dupfilter(TREE * subq)
{
    ...
    /* Initialize */
    ...
    /* No can do, if its a zero table or multi-table subquery */
    ...
    /* If table is already known to be UNIQUE; we are done */
    ...
    /*
    ** Traverse the qualification list and find equijoin
    ** predicates on exactly one correlated table.
    ** Ignore non-EQ predicates on constant expressions.
    */
    for (andnode = aghead->right ; andnode; andnode = andnode->right)
```

-continued

```
    {
        /* If there is a subquery under here, cannot optimize */
        ...
        /*
        ** If we did not find a candidate VAR node in this
        ** qualification subtree, then we cannot optimize.
        */
        ...
        /* Correlated theta-joins are disallowed */
        ...
        /* If its correlated to more than one table, no can do */
        ...
        /* If its a real correlation clause (and not a constant expr)*/
        if ( corrvarmap)
        {
            /* Save the varmap first time through this loop. */
            if (save_corrmap == 0)
            {
                save_corrmap = corrvarmap;
            }
            else if (save_corrmap != corrvarmap)
            {
                /*
                ** Subq. is correlated to more than one tables
                ** from the outer query block. We do not
                ** optimize for such a case.
                */
                return;
            }
        }
    }
    /*
    ** By now, we have a qualification which satisfies the rules
    ** for duplicate filtering on this table. Mark this range entry
    ** as a possible candidate for duplicate filtering.
    */
    subqrg->rgnondiskres->rgndrstat |= RGNDR_DUPFILTER;
    ...
}
```

This routine is responsible for finding candidate tables. The routine is invoked as part of subquery transformation, which comprises part of the pre-processing phase (where heuristics are applied to prune the search space). As shown, the function is invoked with a (pointer to) subquery tree.

Of interest to the method is the target list produced by subqueries. At the outset, the function initializes local structures, then, it tests whether the subquery is a zero table or multi-table subquery; if the subquery is either, then the optimization is not applied. If the table associated with the subquery is known to be unique, then optimization is not required. It will now determine whether all of the joins are equi-joins. If any subqueries are encountered at this point, the join is not simply an equi-join. Examples of disallowed joins include correlated theta-joins. Another example which is disallowed is a flattened inner table which joins to more than one outer table. If on the other hand, the table qualifies, it is marked as a candidate for duplicate filtering.

2. q_isprefix_filter

Given a candidate table, the optimization method figures out whether the index selected for that table is a filter index—that is to say the target list from the query is some permutation (a prefix subset) of the index key which is sought. In an exemplary embodiment, this is performed by a q_isprefix_filter function, which may be constructed as follows.

```
/*
** Q_ISPREFIX_FILTER
**
** This function is called to determine if the join columns of the
```

-continued

```
**      specified table is a prefix of the specified index. In determining
**      if the columns are a prefix, we will ignore any key column for which
**      there is an equality SARG and no join clause.
**
**      The subquery transformations module ensures that the range entry
**      being examined comes from a flattened single table subquery where
**      the table was only correlated with a single table in the outer query
**      block. All join (correlation) conditions are equality conditions of the
**      form VAR = VAR.
**
**      Thus, if index i1 is on inner(f1, f2, f3, f4), then the above conditions
**      are met for the following query:
**
**          select outer.* from outer
**          where outer.f1 in
**              (select f1 from inner
**              where inner.f3 = outer.f3
**                  and inner.f2 = 1 and inner.f4 = 2)
**
**      Parameters:
**          VRANGE *rg      - range element for variable
**          rgid_t varno    - var # of variable
**          INDEX *indexrow - index on table being examined
**          COST  *costp    - index cost descriptor to fill in
**          COST  *basecostp - describes cost of base table scan
**          SDES  *sobjscore - SDES of object being scored
**
**      Returns:
**          none
**
*/
SYB_STATIC void
q_isprefix_filter(VRANGE * rg, rgid_t varno, INDEX * indexrow,
        COST * costp, COST * basecostp, SDES * sobjscore )
    {
    ...
    /* Init */
    ...
    /* Remember which key columns are in join clauses. (If any join
    ** clause includes a column that is not in the key, then the index
    ** cannot be used for duplicate filtering.)
    */
    for (andnode = joinp->jnterms; andnode; andnode = andnode->right)
    {
        ...
    }
    /* We're done if a join column was not in the index key */
    if (andnode)
    {
        return;
    }
    /* For each key column up to the rightmost for which we have a join
    ** condition, see if we have either a join condition or an equality
    ** SARG condition. If so, then the index can be used for duplicate
    ** filtering.
    */
    for (keyctr = 0; keyctr <= maxkeyidx; keyctr++).
    {
        /* Do we have a join condition on this column? */
        /* No join condition, so search for equality SARG */
        for (andnode = rg->rgsclause->scterms; andnode;
                andnode = andnode->right)
        {
            ...
        }
        /* Stop if we did not find an equality SARG on column */
        if (!(andnode))
        {
            break;
        }
    }
    /*
    ** Build list of resdoms pointing at the join columns which
    ** form a prefix subset of the key (minus the columns which
    ** have equality SARGs). This list may be used to compile
    ** a filter. We don't need to build the SARGs into the filter
    ** because they are constant.
    */
    if (keyctr > maxkeyidx)
```

```
    {
        q_computeFilterCost( rg, indexrow, costp, basecostp, sobjscore,
                maxkeyidx );
        q_buildFilterResdoms( costp, keyVarNodes, maxkeyidx );
    }
}
```

The first parameter, rg, is a range element—a table. This is the candidate table. The second parameter, varno, is an internal number assigned to the table; it is employed for housekeeping purposes. The third parameter, indexrow, describes the index on the candidate table. This is followed by the fourth and fifth parameters which represent cost descriptions of the scan; these have already been filled in by the optimizer.

This function serves to mark the cost structure associated with the index. For instance, the function will attach or hang off the cost structure a list of key columns (of the target list). If this information is not filled in, then the index is not a filter index. In operation, the function establishes a "for" loop for examining each key column which comprises the join condition. If any one of these is not a key in the index, then the corresponding index cannot serve as a filter index. The loop finds the last key in the index which is on the target list (i.e., it finds the last key). After determining whether a prefix subset exists, the method fills in the row count and page count and provides a column list. This description is used, in turn, by the code generator to build the filter.

3. opt_considerFilter

Finally, the method determines or considers whether the join order is a "good order"—that is, it supports filtering. This task falls to an opt_considerFilter function. If everything succeeds for this function, the optimization method will attach a filter description to the join order. If the function or routine does not successfully complete, a filter description will not be attached to the join order. This occurs when the join order is not a "good order." In an exemplary embodiment, the function may be constructed as follows.

```
/*
**   opt_considerFilter
**
**      If a sort's only purpose is to eliminate duplicates, consider
**      whether we can eliminate the sort itself by simply filtering
**      out duplicates as they percolate up the tuple stream.
**
**      If the tuples are coming back from the scans in sorted order,
**      then we can get rid of the duplicate-eliminating-sort and
**      replace it with a filter.
**
**      This routine is called for a DISTINCT query. If indices have
**      been selected which cause the target list to come back in sorted
**      order, then we can attach a filter to the last table supplying
**      target columns to remove duplicates. So the conditions are:
**
**      1) DISTINCT query (this was determined by our caller)
**      2) target list consists of simple columns
**      3) target list is coming back in sorted order
**
**      For the moment, we only consider the case where the target list,
**      consists of simple columns (no expressions) from a single table.
**      The select list must comprise a leading subset of the index key
**      used to position the outer table in the join order.
**
**      In the future, we can consider the multi-table case: the select
**      list consists of the complete unique keys of all the outer scans,
**      plus a leading subset of the last scan's key.
**
**
**      For more description of how filters work, see the header for
**      J_FILTER in decision.h.
**
```

-continued

```
**  Parameters
**
**      root pointer to root of query plan
**
**
**  Returns
**      OPT_FILTER_REJECTED     if we can't eliminate the
**                              sort with a filter
**      OPT_FILTER_ATTACHED     if we can
**
**  Side Effects
**      If we can eliminate the sort with a filter, then we will attach
**      a filter descriptor to both the scan that will initialize the
**      filter and the scan that will execute it.
**
**
**
**
**
*/
SYB_STATIC int
opt_considerFilter( TREE * root )
{
    ...
    /*
    **  no dice if resdom list isn't made up of simple columns.
    **  also no dice if more than one table involved. This second
    **  restriction can be lifted as a later project.
    */
    ...
    /* also no dice if this table isn't first in the join order */
    ...
    /*
    **  Get the index for this table.
    **
    **  Reading from the base table will result in the same tuple
    **  order as reading from the Clustered Index. If, in fact, there
    **  is no clustered index on this table, then the table is
    **  unordered and getAlignedIndexRow() will error out.
    */
    ...
    /* now see if all resdoms are keys */
    ...
    /*
    **  If we get here, that means all the resdom columns are keys.
    **  Now we need to make sure that the columns comprise a
    **  prefix set of the key. First we find the prefix that's
    **  used.
    */
    for ( keyPosition = 0; keyPosition < keyCount; keyPosition++ )
    {
                if ( keysUsed[ keyPosition ] != TRUE )
                {
                    break;
                }
    }       /* end of loop through keys */
    /* all the rest of the keys had better be unused */
    for ( ; keyPosition < keyCount; keyPosition++ )
    {
                if ( keysUsed[ keyPosition ] == TRUE )
                {
                    return( OPT_FILTER_REJECTED );
                }
    }
    /*
    **  We have a winner. Now build the qualification to compare
    **  old and new keys. We initialize the filter on the outermost
    **  scan. We execute it at the end of the join order.
    */
    initializer = joindata->jplan[ 0 ];
    executor = joindata->jplan[ joindata->jlastplan ];
    opt_buildFilter( root->left, initializer, executor );
    return ( OPT_FILTER_ATTACHED );
}
```

The first test applied is to determine whether the target list has any expressions in it, such as SELECT A1* 3. Calculated expressions are disallowed. If the target list is composed of columns on a single table and that table is not the first table in the join order, it cannot be guaranteed that tuples will stream in the correct order. Therefore, this case is disallowed as well. The next two loops ensure that the result columns form a prefix subset of the index key. In such a case, a filter can be attached. At the conclusion, the function invokes another routine, opt_buildFilter, which builds the actual filter. In essence, this builds the expression necessary to evaluate the filter on the virtual machine (which executes the code generated by the code generator).

Appended herewith, as microfiche Appendix A, are source listings presented in the C programming language providing further description of the present invention. Compiler/linkers for compiling C source listings are available from several vendors, including Microsoft Corp. (Redmond, Wash.) and Sun Microsystems (Mountain View, Calif.).

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a database system storing a plurality of database tables, each database table comprising a plurality of tuples storing columns of information, each column representing a particular category of information for which each tuple stores a data value, a method for eliminating duplicate tuples from a tuple stream, the method comprising:

receiving a query specifying selection criteria for selecting information of interest from the database system, said query specifying that said information of interest is to be selected by a database join operation which joins selected ones of said database tables by one or more columns shared between tables (key columns), said query further specifying that the particular information is to be returned as distinct tuples;

determining a join order specifying a sequence indicating how said selected ones of said database tables are to be preferentially scanned by the system for determining which tuples of each said selected ones of said database tables qualify, said join order indicating innermost and outermost tables of the join and being selected so as to guarantee that tuples will stream in order during execution of the query;

initializing a filter at the outermost table for said one or more key columns, for forcing the method to pass a first tuple encountered and to construct an initial key from it;

attaching the filter to the innermost table, so that the filter is executed for each tuple which qualifies on the innermost table;

executing the query for generating a tuple stream satisfying said selection criteria, said executing step including scanning, according to said determined join order, said selected ones of said database tables; and as the innermost table is scanned, executing the filter for filtering duplicate tuples from the tuple stream by discarding those tuples having keys already encountered in the tuple stream.

2. The method of claim 1, wherein said query comprises a structured query language (SQL) statement including a DISTINCT command.

3. The method of claim 1, wherein said one or more columns shared between tables comprises a single column shared between tables.

4. The method of claim 1, wherein said one or more columns shared between tables comprises two or more columns shared between tables.

5. The method of claim 1, wherein said determining a join order step includes:

determining by a optimizer, an optimal join order for executing the query.

6. The method of claim 1, wherein said executing the filter step includes:

constructing a key for each tuple;

if the key has changed from that of a previous key, passing the tuple into the tuple stream; and if the key has not changed from that of a previous key, discarding the tuple, so that it is eliminated from the tuple stream.

7. The method of claim 1, wherein said query comprises a structured query language (SQL) statement having a general form of:

SELECT DISTINCT
FROM
WHERE.

8. The method of claim 1, wherein duplicate tuples are eliminated from the tuple stream without sorting the tuple stream.

9. The method of claim 1, wherein duplicate tuples are eliminated from the tuple stream without hashing keys for lookup.

10. The method of claim 1, further comprising:

determining before application of the filter, whether the tuple stream is already unique; and if the tuple steam is already known to be unique, passing all tuples of the tuple stream.

\* \* \* \* \*